July 12, 1966 E. J. CRUM 3,260,471
APPARATUS AND METHOD FOR HANDLING LOOPED WIRE
Filed June 11, 1964 4 Sheets-Sheet 2

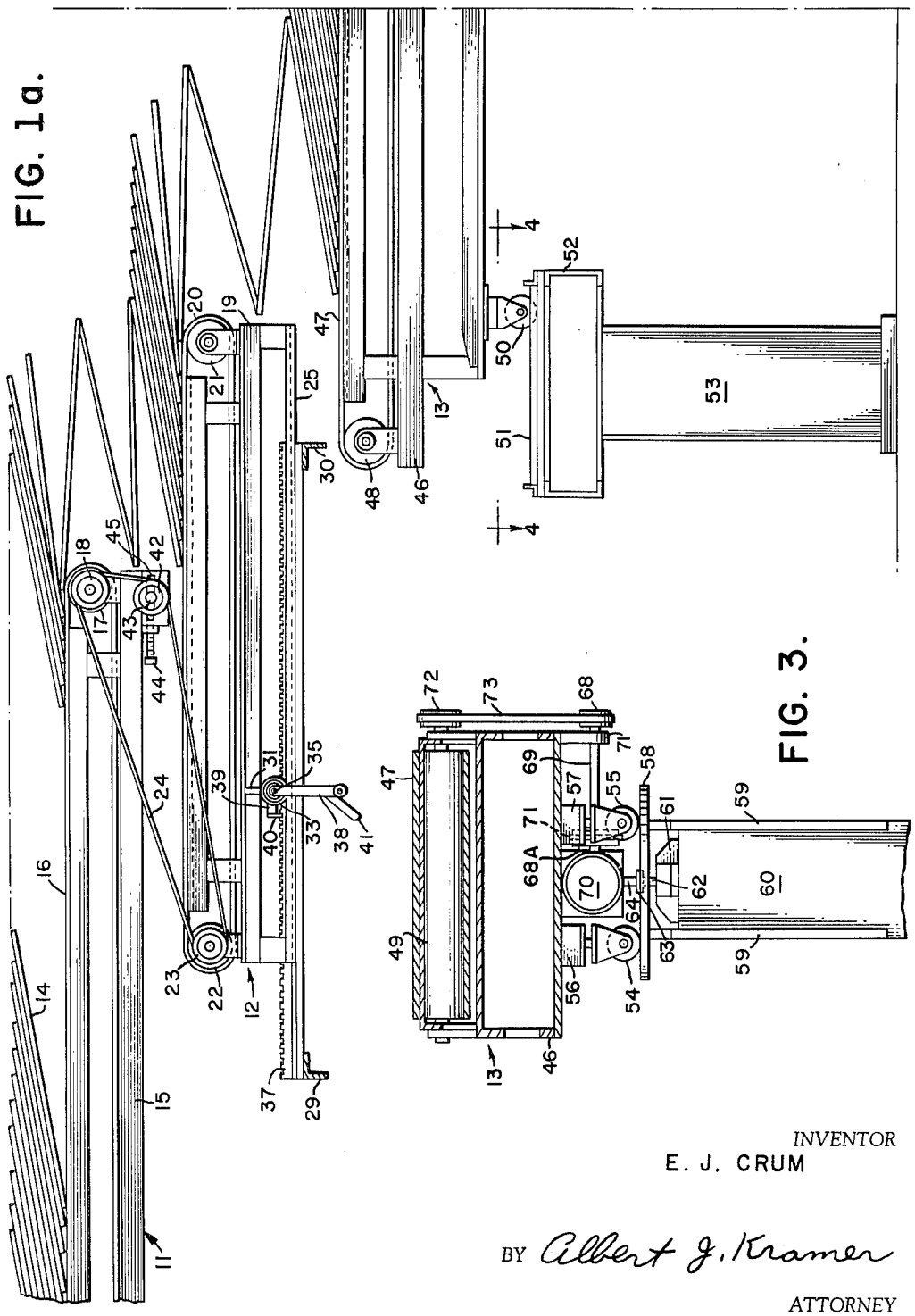

INVENTOR
E. J. CRUM

BY Albert J. Kramer
ATTORNEY

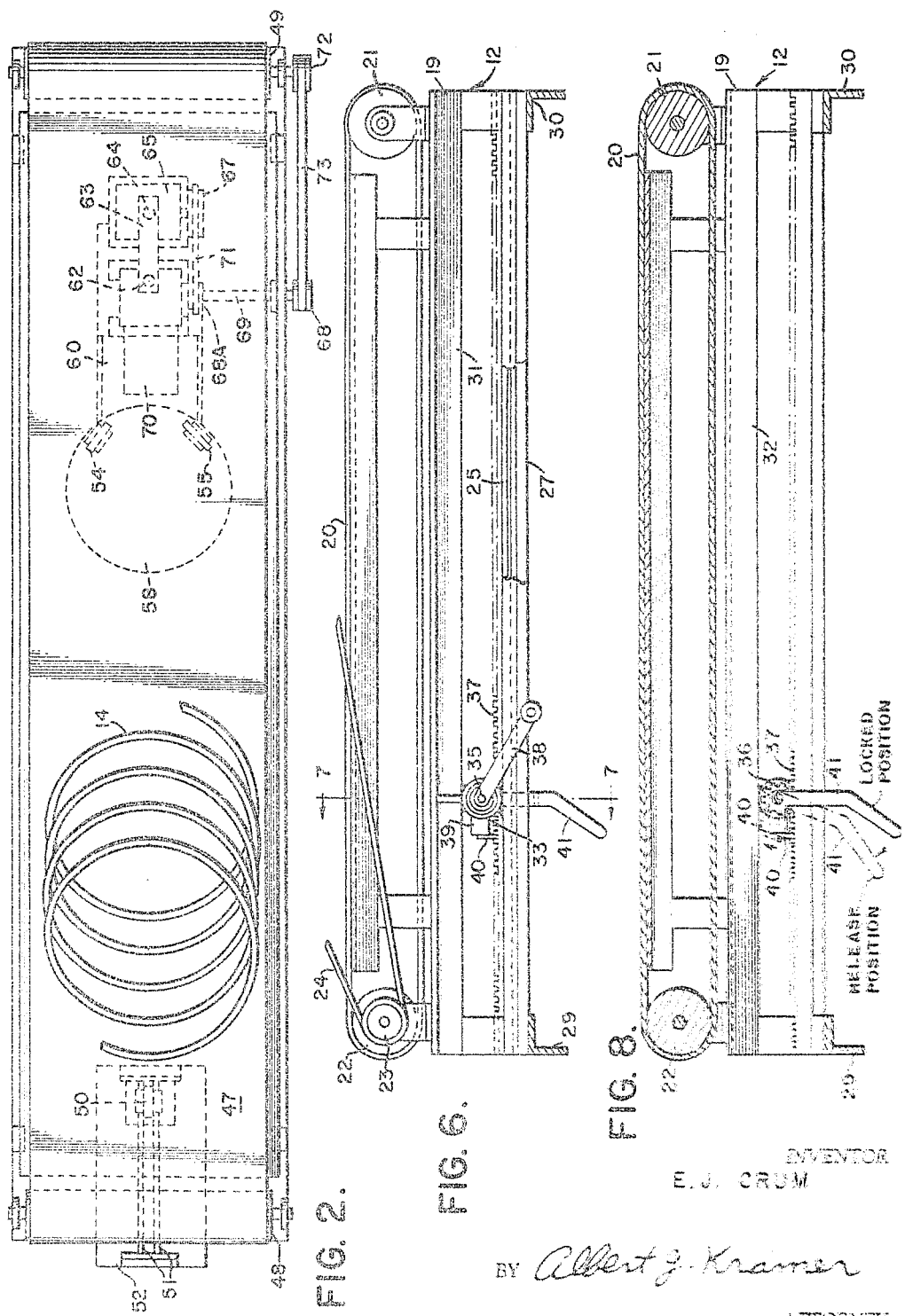

July 12, 1966 E. J. CRUM 3,260,471
APPARATUS AND METHOD FOR HANDLING LOOPED WIRE
Filed June 11, 1964 4 Sheets-Sheet 4

INVENTOR
E. J. CRUM

BY *Albert J. Kramer*
ATTORNEY

United States Patent Office 3,260,471
Patented July 12, 1966

3,260,471
APPARATUS AND METHOD FOR HANDLING LOOPED WIRE
Eben Jefferson Crum, P.O. Box 6763, Towson, Md.
Filed June 11, 1964, Ser. No. 374,359
14 Claims. (Cl. 242—79)

This invention relates to the handling of wire and it is more particularly concerned with the handling of wire in loop form.

In my prior Patent No. 3,103,237, I have described a device by means of which wire in linear form is fed to a loop forming unit. Loops of wire formed by the unit are dropped onto a conveyor and the conveyor functions to deliver the loops to a coil forming unit. The latter unit functions by arranging the loops on a horizontal support to form a geometrically patterned self-supporting coil. This involves shifting the loops as they fall in a horizontal direction relative to the support member in order to form the desired coil pattern.

The present invention has for its general object the provision of means for handling loops of wire so that they can be formed into a geometrically patterned coil as they fall from the end of a conveyor without the intervention of any other means between the conveyor and a stationary support on which the coil is to be formed or by actual movement of the support member in relation to the loops as they fall.

Another object of the invention is the provision of means for supporting a wire loop conveyor on movable supports and means for moving the discharge end of the conveyor in a closed path in a horizontal plane so that the loops as they drop from the conveyor will become arranged on a stationary surface below in a generally helical pattern.

A further object is the provision of a conveyor system for use with the apparatus that comprises means for varying the operating characteristics of the device in accordance with coils of different density to be formed.

These and still further objects, advantages and features of the invention will appear more fully from the following description considered together with the accompanying drawing.

In the drawing:

FIGS. 1a and 1b together comprise a side elevational view of an embodiment of the invention showing the flow of wire loops thereon.

FIG. 2 is a top plan view of the lowermost conveyor of the embodiment.

FIG. 3 is a cross-sectional view along the line 3—3 of FIG. 1b.

FIG. 4 is a plan sectional view along the line 4—4 of FIG. 1a.

FIG. 6 is a side elevational view of the intermediate conveyor and its supporting structure on a larger scale and partly broken away.

FIG. 8 is a longitudinal sectional view along the line 8—8 of FIG. 7.

Figure 5:
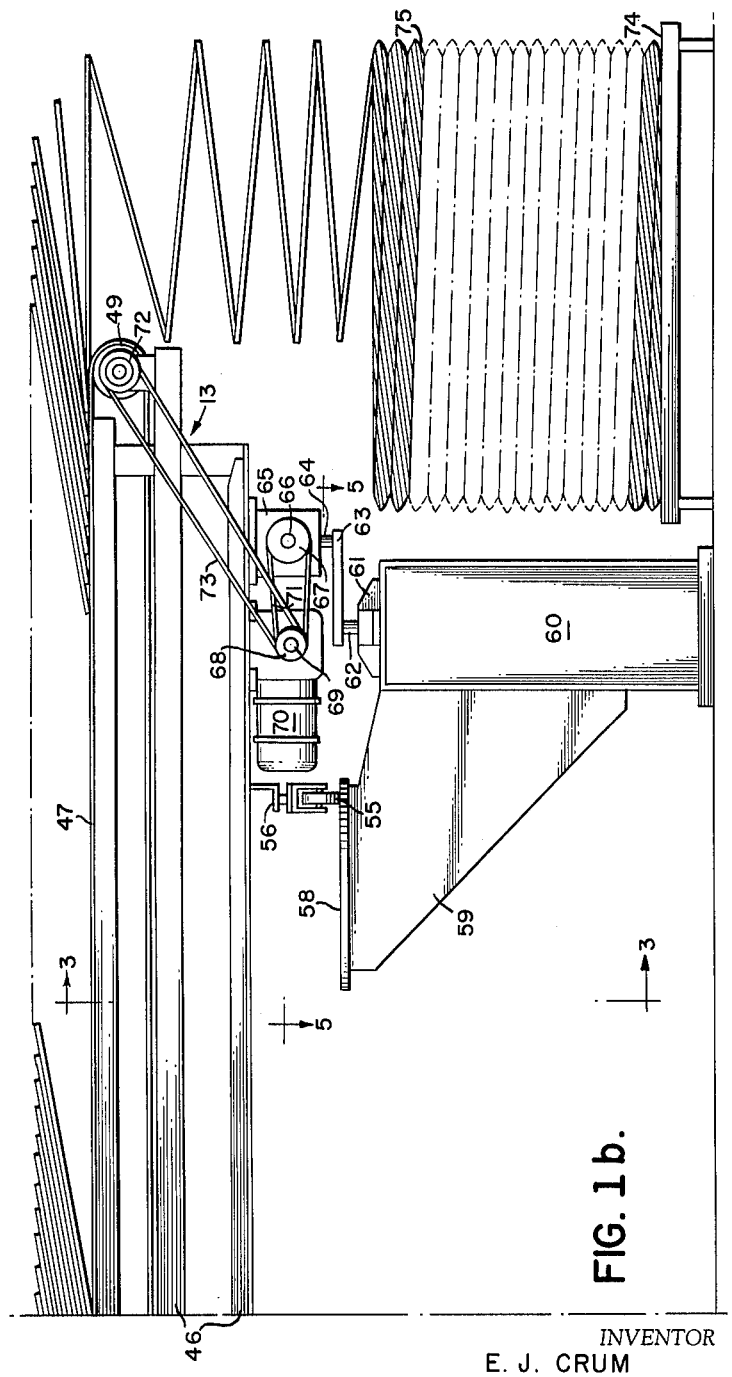
FIG. 5 is a plan sectional view along the line 5—5 of FIG. 1b.
Figure 4:
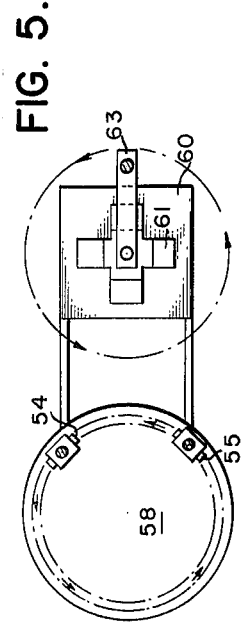
Figure 1B:
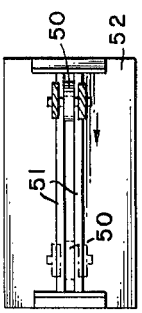
Figure 7:
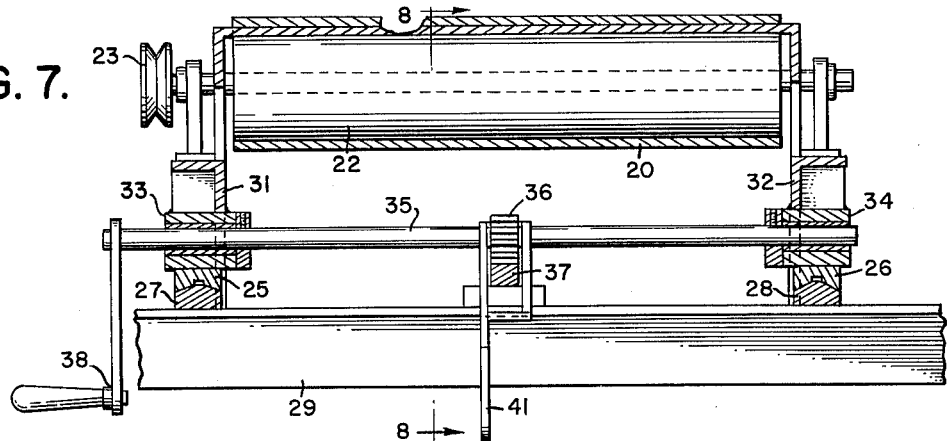
FIG. 7 is a cross-sectional view along the line 7—7 of FIG. 6.
Figure 9:
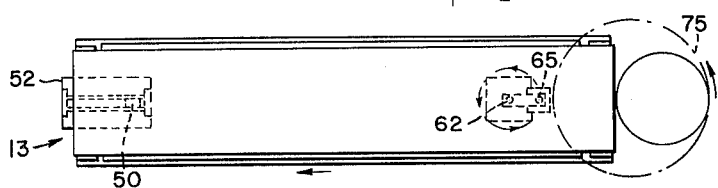
FIGS. 9, 10, 11 and 12 are schematic plan views of the lowermost conveyor on a smaller scale showing the various positions which it assumes in a cycle of operation.
Figure 10:
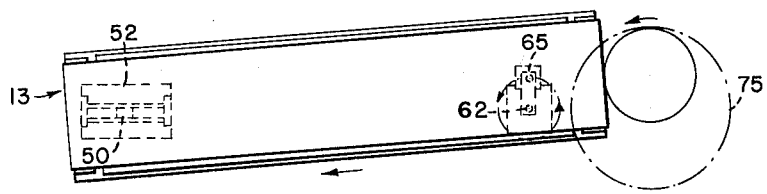
Figure 11:
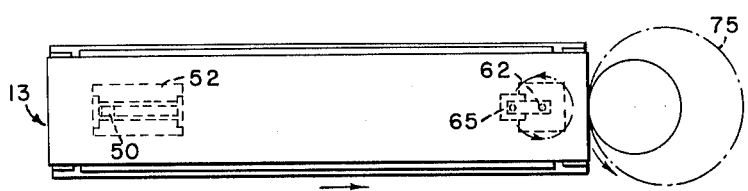
Figure 12:
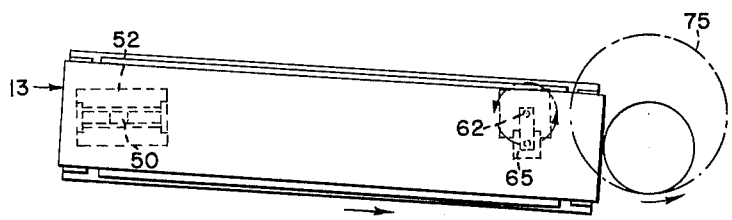

Referring to the drawing with more particularity, the embodiment illustrated comprises an uppermost conveyor 11 of a conventional design, an intermediate conveyor 12, and a lowermost conveyor 13, said conveyors being serially arranged longitudinally in overlapping relation.

The uppermost conveyor 11 receives wire 14 in loop form from any source such as a loop forming device (not shown herein, but see U.S. Patent No. 3,103,237). This conveyor is supported in a stationary position by any suitable conventional means (not shown) and it comprises a frame 15, a belt 16 and a belt support roller 17 connected to a pulley 18 for rotation therewith. Other conventional rollers necessary to properly support the belt are provided but not illustrated in the drawing.

The intermediate conveyor 12 comprises a frame 19, a belt 20, a front support roller 21 and a rear support roller 22. The rear roller 21 is connected to a pulley 23 for rotation therewith and the pulleys 23 and 18 are geared together by means of a belt 24.

The frame 19 comprises longitudinal skid beams 25 and 26 on either side which are slidably disposed on longitudinal rails 27 and 28, respectively. These rails are secured to stationary support members 29 and 30. The meeting surfaces of these rails and skid beams are of mating dovetail configurations to resist displacement sideways.

The frame 19 also comprises a pair of vertical standards 31 and 32 on opposite sides of the conveyor. These standards are provided with bearings 33 and 34, respectively, for rotatably supporting a jack shaft 35. The shaft 35 is provided with a pinion 36 which is secured to and rotates with the shaft. The pinion meshes with a longitudinal rack 37 which is fixed in a stationary position between and parallel to the rails 26 and 27, such as to the support members 29 and 30.

One end of the shaft 35 is provided with a crank 38 by means of which the pinion 36 may be manually rotated to cause movement of the conveyor along the rails.

The conveyor is releasably secured in any desired position along the rails by means of a pawl 39 pivoted to the shaft 35 adjacent the pinion 36 and having a dog 40 adapted to engage the space between any consecutive pair of teeth of the rack 37. The pawl 39 is downwardly biased to such an engaging position by means of a handle bar 41 attached to the pawl in a hanging position to tilt it to the engaging position. Adjustment of the conveyor along the rails 27 and 28 require adjustments in the length of the belt 24. This may be effected by any conventional means such as the idler pulley 42 mounted on the frame 15 of the upper conveyor 11. The idler pulley shaft 43 abuts a lead screw 44 under pressure of the belt 24 and is slidably mounted in a slot 45 of the conveyor frame. The position of the idler pulley 42 is, therefore, adjustable by turning the lead screw 44.

The lowermost conveyor 13 comprises a conventional conveyor frame 46, a belt 47 and support rollers 48 and 49. The rear end of the frame 46 is provided with a swivel wheel 50 that moves in a guide channel track 51 on a platform 52. The platform 52 is secured to the top of a rigid column 53 or other suitable support structure.

The front end of the frame 46 is supported by a pair of swivel casters 54 and 55 attached to the bottom of the frame by brackets 56 and 57. These casters rest on a circular platform 58 that is supported on a cantilever bracket 59 attached to a rigid column 60.

On top of the column 60 there is attached a conventional thrust bearing 61 for a vertical stub shaft 62 at one end of a crank arm 63. The other end of the crank arm 63 is connected to the vertical shaft 64 which comprises the output shaft of a gear box 65. The gear box 65 is secured to the bottom of the frame 46 and it has an input shaft 66 to which a pulley 67 is secured. The pulley 67 is geared to a pulley 68A on the output shaft 69 of a gear motor 70 by means of a belt 71. The gear motor is also secured to the bottom of the frame 46 alongside the gear box 65. Another pulley 68 on the output shaft 69 is also geared to a pulley 72 connected for rotation to the roller 49 by a belt 73.

By these means the gear motor 70 drives the conveyor belt 73 and, through the gear box 65, drives the output shaft 64. Rotation of the latter causes the front end of the frame 46 to orbit about the shaft 62 while being supported by the casters 54 and 55 on the platform 58. In executing this orbiting motion the end of the frame 46 is required to move a distance equal to twice the length of the crank arm 63. This is made possible by means of the rear swivel wheel 50 in the guide channel track 51.

The effective length of the conveyor 13 is the distance between its forward end and the forward end of the intermediate conveyor 12. This effective length can be changed for changing the longitudinal position of the intermediate conveyor 12 relative to the lower conveyor 13, that is, by changing the amount of overlap between these two conveyors. This is accomplished by simply turning the crank 39.

The speed of the conveyor 13 is synchronized with the orbital velocity of the crank-arm 63 such that the belt 47 travels a linear distance equal to the effective length of the conveyor on each revolution of the crank-arm. As the loops of wire are carried beyond the delivery end of the conveyor 13 they fall onto a stationary support 74 and are helically arranged in a coil 75, each revolution of the crank providing one helical layer of loops. The number of loops in each helical row for proper formation of the coil should be equal to the number of loops of wire on the conveyor 13 between the points that define its effective length. Thus, the required effective length of the conveyor equals substantially the number of loops desired in each helical layer of the coil multiplied by the average spacing of consecutive loops. This distance will vary with the density of the coil being formed. To compensate for this variable factor, the intermediate conveyor 12 is made longitudinally adjustable, as explained above, in order to change the effective length of the lower conveyor, that is the distance between the points on which the loops are received and the point where they are dropped off.

Having thus described my invention, I claim:

1. The method of handling a continuous length of wire in the form a series of consecutive loops comprising moving the loops on a longitudinal horizontal conveyor, permitting the loops to fall from one end of the conveyor onto a collecting surface under the force of gravity, while moving said end of the conveyor bodily in a closed horizontal path, whereby the falling loops become arranged on the collecting surface in the form of a helical coil having a pattern corresponding to said path.

2. The method as defined by claim 1 and maintaining the number of loops of the wire on the effective length of the conveyor during formation of the coil substantially equal to the number of loops in each layer of the coil.

3. Apparatus for handling a continuous length of wire in the form of a series of consecutive loops comprising an elongated horizontal conveyor, said conveyor comprising a rigid frame structure, means for supporting one end of the frame structure presented as the loading end for longitudinal movement, and means for supporting the other end of the frame structure presented as the discharge end and moving it in a horizontal closed path, whereby loops of the wire carried by the conveyor to the discharge end will, when permitted to fall therefrom on a stationary support be arranged in layers of a helical coil pattern corresponding to said path.

4. Apparatus as defined by claim 3 and means for maintaining the number of loops of the wire on the effective length of the conveyor during formation of the coil substantially equal to the number of loops in each layer of the coil.

5. Apparatus as defined by claim 3 and means for loading onto the conveyor at its loading end loops of the wire at a frequency corresponding to the frequency of discharge of loops at the delivery end of the conveyor.

6. Apparatus as defined by claim 5 in which the loading means comprises a second longitudinal conveyor having a stationary discharge end overlapping the first conveyor at its loading end.

7. Apparatus as defined by claim 6 and means for adjusting the amount of overlap of the discharging end of the second conveyor relative to the loading end of the first conveyor.

8. Apparatus as defined by claim 6, means supporting the second conveyor for longitudinal displacement bodily relative to the first conveyor, means for adjusting the position of the second conveyor on said supporting means, and means for releasably holding the second conveyor in adjusted positions on said supporting means.

9. Apparatus as defined by claim 6, stationary rails supporting the second conveyor for longitudinal movement bodily relative to the first conveyor, rack and pinion means for adjusting the position of the second conveyor on said rails, and a pawl for releasably holding the second conveyor in adjusted positions along said rails.

10. Apparatus as defined by claim 9 in which the conveyor comprises a frame structure having members slidably engaging the rails, said members and rails having engaging surfaces adapted to resist relative lateral displacement.

11. Apparatus as defined by claim 3 in which the means for moving the delivery end of the conveyor in a horizontal closed path comprises a crank having a crank-arm, a stationary member, means pivotally supporting one end of the arm on the stationary member, a shaft rigidly secured to the other end of the arm, means pivotally connecting the shaft to the conveyor frame and means for rotating the shaft.

12. Apparatus as defined by claim 11, a power unit secured to the conveyor frame, said shaft comprising the output drive of the power unit.

13. Apparatus as defined by claim 3 in which the means for supporting the ends of the conveyor frame comprises a stationary horizontal platform at the delivery end and casters attached to the conveyor frame resting on the platform.

14. Apparatus as defined by claim 13, a stationary straight track at the loading end of the conveyor and a wheel swiveled to the conveyor frame and engaging said track.

References Cited by the Examiner
UNITED STATES PATENTS 1,121,480    12/1914    Connelly _____ 242—82
2,957,646    10/1960    Crum _____ 242—83 X ROBERT B. REEVES, *Primary Examiner.*

R. A. SCHACHER, *Assistant Examiner.*